United States Patent [19]
Duncan, Jr.

[11] 3,805,443
[45] Apr. 23, 1974

[54] YO YO CONSTRUCTION

[76] Inventor: Donald F. Duncan, Jr., 4380 Camino Cardenal, Tucson, Ariz. 85718

[22] Filed: Jan. 12, 1973

[21] Appl. No.: 322,921

[52] U.S. Cl. .................................................. 46/61
[51] Int. Cl. ............................................ A63h 27/12
[58] Field of Search ........................................ 46/61

[56] References Cited
UNITED STATES PATENTS

| | | |
|---|---|---|
| 3,444,644 | 5/1969 | Sayegh .................................. 46/61 |
| 2,591,954 | 4/1952 | Madsen .................................. 46/61 |
| 2,629,202 | 2/1953 | Stivers et al. ......................... 46/61 |
| 3,256,635 | 6/1966 | Radovan ................................ 46/61 |

*Primary Examiner*—Hugh R. Chamblee
*Attorney, Agent, or Firm*—Mann, Brown, McWilliams & Bradway

[57] ABSTRACT

A yo yo with maximum weight distributed in the outer periphery of the yo yo body, removable side caps, and a reinforcing axle spool for joining the body halves together.

5 Claims, 7 Drawing Figures

PATENTED APR 23 1974  3,805,443
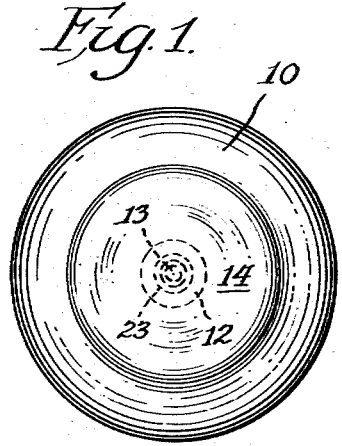
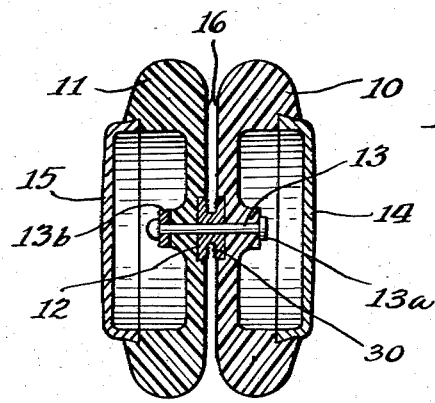
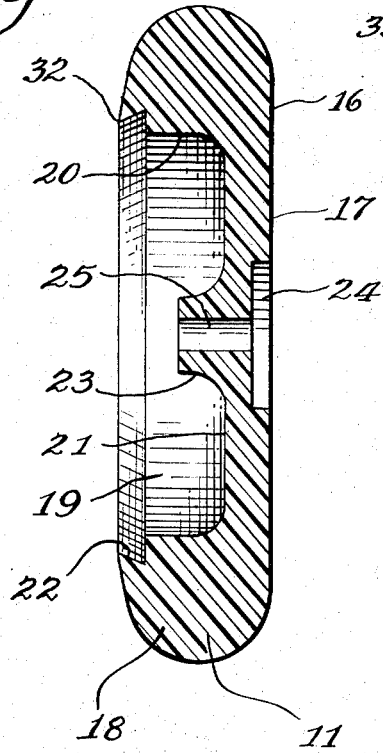
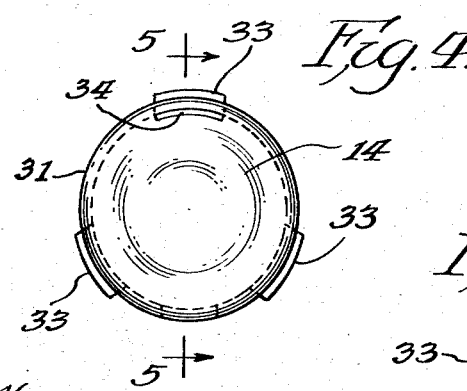
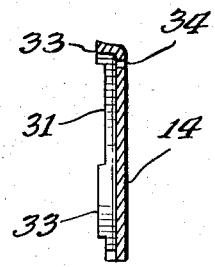
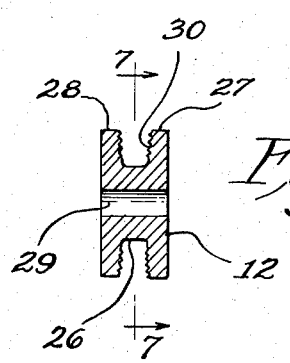
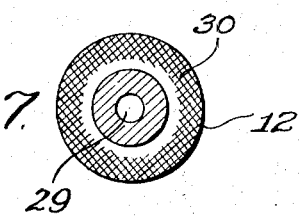

YO YO CONSTRUCTION

The present invention is directed to yo yo toys.

The principal purposes of the present invention are to form a yo yo toy in such a manner that it is easily assembled with a precision spacing of the yo yo body halves, to form a connection of the yo yo body halves in a manner such that it reinforces the body halves in the central regions thereof, thus enabling use of thin walled sections in the central regions while providing maximum weight in the outer regions of the body halves, to form the body halves in a manner providing widely varied and different styling effects, and to form the yo yo in a manner providing better and longer spinning action.

These and other purposes of the present invention will become more apparent in the course of the ensuing specification and claims when taken with the accompanying drawings, in which:

FIG. 1 is a side view of a yo yo embodying the present invention;

FIG. 2 is a sectional view of the yo yo illustrated in FIG. 1;

FIG. 3 is an enlarged sectional view of one body half of the yo yo illustrated in FIG. 2;

FIG. 4 is a side view of a side cap for the yo yo appearing in FIG. 1 and FIG. 2;

FIG. 5 is a sectional view of the side cap illustrated in FIG. 4;

FIG. 6 is a sectional view of a connecting and reinforcing spool illustrated in FIG. 2; and FIG. 7 is a side sectional view of the spool illustrated in FIG. 6.

Like elements are designated by like characters throughout the specification and drawings.

With particular reference now to the drawings, and in the first instance to FIGS. 1 and 2, the numerals 10 and 11 designate yo yo body halves which are held together in spaced and generally parallel relation by means of a spool 12 and pin 13 which will be described. Each body half includes removable cover caps 14 and 15 on the outer sides thereof.

The body halves 10 and 11 may be conveniently formed from molded plastic material while the spool 12 is formed of metal or a hard wood such as maple. The side caps 14 and 15 may be formed from molded plastic material or from thin walled metal stampings.

The body halves are identically formed and have inner substantially plane surfaces 16 which face one another. As will be seen most clearly in FIG. 3, each body half is defined by a unitary body with a central portion 17 and an outer annular portion 18. The outer annular portion 18 projects outwardly from the central portion 17 so as to define a recess 19 bounded by the inner circular wall 20 of the annular portion and the outwardly facing wall 21 of the central portion. The outer surface of the annular portion may be rounded between the inner plane surface 16 and the recess, as illustrated. The annular portion is undercut as at 22 at the juncture of the cylindrical wall 20 and the outwardly facing surface of the annular portion. This undercut preferably is formed of an angle of around 15° with the spinning axis of the yo yo body.

The central portion includes a hub 23 which projects outwardly within the recess 19. The circular recess 24 is formed in the inner face 16 of the body half to receive the spool 12 in a manner which will be described. A bore 25 is formed through the hub 23.

Spool 12 is formed by machining. The spool 12 is formed with a central axle portion 26 and spaced circular flanges 27 and 28. The spool 12 has a bore 29 formed axially thereof to receive the pin 13. The inner faces of the flanges may be knurled as at 30 (FIG. 7). The knurling may be omitted with some materials such as hard wood or aluminum. Flanges 27 and 28 have a thickness and diameter such as to be snugly received within the recesses 24 of the body halves. The diameter of the flanges is preferably approximately fifty per cent or more than the external diameter of the hubs 23. The body halves are assembled by moving the body halves over the spool with the flanges seated in the recesses 24. Pin or rivet 13 is then passed through the bore of one hub, through the bore of the spool, and through the bore of the other hub. One end of the pin 13 has a head 13a which bears against the one hub. The other end of the pin is upset against a washer 13b so that the two body halves are pressed firmly against the flanges of the spool. Through use of the spool 12 a strong reinforcing is provided for the central portions of the body halves so that the forces from the string which is passed around the spool between the flanges thereof are distributed over a relatively large area of the central portions of the body halves. This enables relatively thin walled sections at the central portions of the body halves. Use of the spool also insures a precision spacing and alignment of the body halves.

As will be noted particularly in FIG. 3, the annular portion 18 is located in the outer half of the overall radial dimension of the body half. The central portion 17 preferably has a thickness less than one-third of the thickness of the annular portion 18. This provides for more than 80 percent of the total weight of each yo yo body half in the outer annular portion. Distribution of the weight in this fashion provides an enhanced flywheel effect for longer spinning of the yo yo when used for tricks. Longer spinning times are particularly desirable in connection with tricks performed with the yo yo.

The side cover caps 14 are formed as thin plates with an annular rim 31 which is adapted to mate with the outer circular edge 32 of the undercut. The rim is flared outwardly slightly, as for example, at an angle of approximately 15° relative to the spinning axis. Circumferentially spaced tabs 33 extend outwardly from this annular rim. The side caps are formed from a thin walled relatively resilient material so that the tabs 33 may be snap-fitted into the undercut 22. One or more slots 34 may be formed in the plates adjacent the rim 31 to allow a fingernail gripping and prying action for removing the caps. The side caps are assembled after the two body halves are assembled and are easily snap-fitted in place. Use of the removable and snap-fitting cover caps enables access to the hubs 23 which allows use of the headed pin 13 for positively holding the body halves together. Formation of the side caps in this manner also enables different styling effects with the same basic yo yo body. The same basic yo yo body may thus be sold in different appearing styles or may be sold with a number of undecorated side caps in kit fashion which enable the user to create his own particular designs and styling effects. The recesses 19 may be used for storage of a spare string.

I claim:

1. A yo yo comprising a pair of spaced body halves having parallel inner surfaces facing one another, each body half having a central section and an outer annular section joined thereto, each annular section projecting outwardly from said central section to thereby define an outwardly facing recess bounded by the outer wall of said central section and said annular section, each central section having a hub formed around the axis thereof and projecting into said recess, a spacing spool having a central axle portion and outer flanges of greater diameter than said axle portion, each of said flanges abutting the inwardly facing surface of one of said body halves respectively and joined to the inner surfaces of each body half, a pin passed through axially aligned bores in said hubs, central sections and spool and fixed to said hubs, and side cover plates overlying said recesses and connected to said annular portions in a snap-fitting relation.

2. The structure of claim 1 wherein the outer annular portion of each body half is located in the outer half of the overall radial dimension of each half and comprises more than eighty per cent of the total weight of each half.

3. The structure of claim 1 wherein the flanges of said spool are seated in recesses in the inner surfaces of said body halves.

4. The structure of claim 1 wherein said annular portions have a circular undercut in outwardly facing surfaces thereof and said cover plates have circumferentially spaced tabs seated in said undercut.

5. The structure of claim 1 wherein said pin has a head on one end thereof bearing against one hub and is upset on the other end thereof so as to form a positive holding connection for said body halves.

* * * * *